July 2, 1974     P. L. VELTMAN     3,822,220

PREPARATION OF CATALYSTS

Filed Aug. 1, 1972

United States Patent Office 3,822,220
Patented July 2, 1974

3,822,220
PREPARATION OF CATALYSTS
Preston Leonard Veltman, Severna Park, Md., assignor to W. R. Grace & Co., New York, N.Y.
Filed Aug. 1, 1972, Ser. No. 277,010
Int. Cl. B01j 11/06, 11/32, 11/40
U.S. Cl. 252—458                5 Claims

ABSTRACT OF THE DISCLOSURE

Inorganic oxide catalysts supports are coated with catalytically active metals by a process which involves first forming a semi-conductive coating of carbon on the substrate and then contacting the coated substrate with a solution of the catalytically active metal ions under electrolysis conditions. The catalytically active metal deposits on the surface of the carbon coated surface in a thin, uniform layer. The carbon may then be removed by conventional oxidation techniques.

---

The present invention relates to a method for preparing catalysts, and more specifically to a procedure for applying an extremely uniform, thin coating of catalytically active metal upon a substantially non-electro conductive inorganic oxide support.

Catalysts useful for catalyzing many chemical reactions comprise small amounts of catalytically active metals deposited upon an inorganic oxide base such as alumina, silica-alumina, silica, clay, magnesia, molecular sieves and so forth. Preparation of catalysts generally involves impregnation of the inorganic oxide substrate with aqueous solutions of metal ions. Subsequent to impregnation with the ion containing solution, the catalyst composition is dried and further processed to convert the metal ions to the desired catalytic form of the metal such as oxide, sulfide, and so forth.

Conventional impregnation procedures are generally adequate for the preparation of catalysts which contain relatively large quantities of inexpensive promoter metals. However, when small quantities of expensive metals, such as noble metals, are utilized, it is frequently found that conventional solution impregnation procedures result in the inefficient use thereof.

It is, therefore, an object of the present invention to provide an improved catalyst preparation procedure.

It is another object to provide a method for depositing extremely uniform layers of catalytically active metal upon an inorganic oxide support.

It is a further object to provide a technique for efficiently combining extremely low concentrations of valuable catalytically active metals upon a substantially non-electroconductive inorganic oxide support.

These and further objects of the present invention will become readily apparent to one skilled in the art from the following detailed description and drawing, wherein.

Broadly, my invention contemplates a catalyst preparation procedure wherein an inorganic oxide catalyst support is first coated with a thin layer of semi-electroconductive carbon, then contacted with a solution of metal ions under electrolysis conditions whereupon a thin, uniform layer of the metal is deposited upon the catalyst surface. Subsequently, the semi-conductive carbon layer may be removed by oxidation of the carbon to volatile carbon-oxide products.

More specifically, I have found that metal containing catalyts may be effectively produced by the following novel procedure:

1. An inorganic oxide catalyst support material, such as clay, silica, alumina, silica-alumina hydrogel, crystalline alumino silicate molecular sieve zeolite, and magnesia, is coated with a thin, uniform layer of semi-electrode conductive carbon. The carbon is preferably deposited by first coating the inorganic oxide with a hydrocarbon compound, such as butane, and carefully heating to remove the hydrogen by cracking at 480 to 800° C. to leave a thin, carbon residue.

2. The carbon coated particle is then contacted with a solution of the desired catalytically active metal ion under electrolysis conditions required to electro-deposit a thin, uniform layer of the catalytically active metal upon the carbon coated surface.

3. The metal-carbon coated, inorganic oxide particle may then be subjected to oxidation conditions to oxidize and remove the carbon as gaseous carbon-oxide, reaction products.

4. The metal coated particle may then be subjected to further chemical treatment to convert the metal coating to the desired oxide, sulfide, chloride form of the metal.

Figure 1:
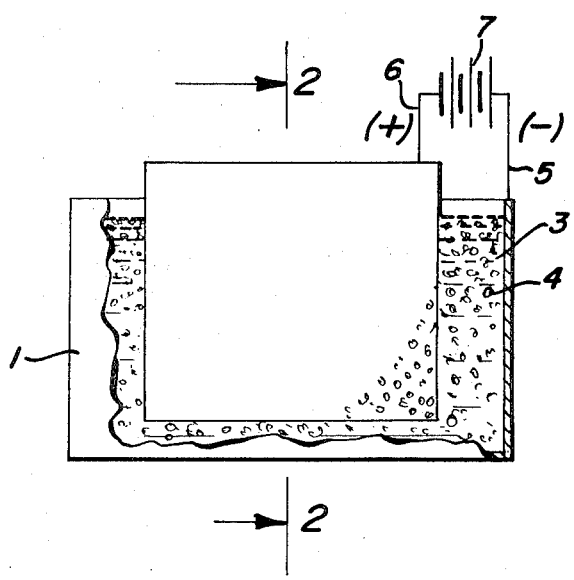
FIG. 1 is a plane view with parts broken away of an electrolytic cell, which may be utilized in the practice of the present invention.

A more comprehensive understanding of my invention may be obtained by reference to the drawing, wherein FIG. 1 represents a typical, electrolytic cell substrate disclosed in U.S. Pat. 3,616,356 in which the method of my present invention may be practiced. Referring to FIG. 1, it is noted that electrode container or case 1 contains a center electrode surface 2. The cell also contains electrolyte 3 and is also filled with particulate electrode particles 4. The cell container 1 serves as one electrode surface and is provided with a conductor 5. The center electrode 2 is connected to an electrical conductor 6 which in turn is connected to a source of DC current 7 along with the conductor 5. As shown in FIG. 1, the center electrode is positively charged and serves as the anode, whereas the cell container or case 1 is connected to the negative side of the current source 7 and serves as the cathode.

Figure 2:
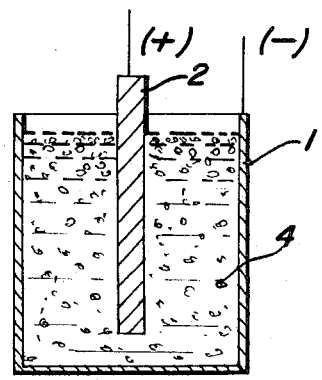
FIG. 2 is a cross-sectional view of the cell shown in FIG. 1 taken along line A—A.

Reference to FIG. 2. which is a cross-sectional view of FIG. 1, reveals that the electrode container is substantially filled with the particulate electrode material 4, and the center electrode 2 is spaced approximately in the center of the cell container 1.

Figure 3:
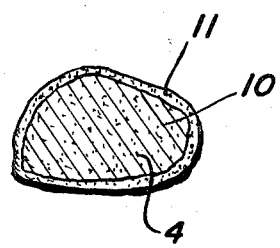
FIG. 3 is a cross-sectional view of a carbon coated catalyst particle substrate used in the practice of the present invention.

FIG. 3 is an enlarged cross-sectional view of the particulate electrodes 4 which are used to fill the cell container 1. FIG. 3 reveals that the center of the particle comprises an inorganic oxide core 10 and is surrounded by a relatively thin carbon layer 11 having a thickness of about one to ten microns. In general, the particle 4 possesses an elongated shape, preferably on the order of from about 2 to 5 mm. in length. The cross-sectional diameter or dimension of the particle as shown in FIG. 3 is preferably approximately 1 mm. or greater, both in the vertical and horizontal direction, as depicted in FIG. 3. In general, it is found that the carbonaceous layer, which is depicted as being formed on the surface of the particle, may also extend into the pores which the inorganic oxide particle may possess. However, in certain instances, the inorganic oxide particle will possess a substantially non-porous configuration, as shown in FIG. 3, and hence the carbonaceous layer 11 is generally deposited merely on the surface thereof.

In operation, the electrode particles 4 are placed within the cell container 1. It is noted that the electrode particles are in contact with the electrode surfaces 1 and 2 and substantially fill the entire space existing therebetween. In general, it is found that cells having a configuration, such that the distance between the center and side electrodes is on the order of about 1 inch or less, are generally preferred. Subsequent to filling the cell with the semi-conductive particulate electrode material 4, an electrolyte solution, which comprises a solution of the desired metal ion, is added to the cell. A voltage sufficient to cause deposition of the metal ions in the electrolyte solution 3 is then impressed between the anode and cathode surfaces 1 and 2. The precise voltage applied, and the duration over which the voltage is applied, will depend upon the specific thickness and amount of metal which is to be deposited on the surface oft he catalyst particles 4. In general, it is found that voltages ranging from about one to three volts and times on the order of from about 10 to 60 minutes, are sufficient to deposit the required catalytic amounts of metals, which may range from as little as 0.001% to as much as 25% by weight of the finished particle.

The present method of catalyst preparation may be utilized in the preparation of practically any catalyst composition, which comprises catalytically active metals deposited on an inorganic oxide substrate. Thus, for example, the present technique may be utilized in the preparation of expensive petroleum reforming catalyst compositions, which generally comprise a Group VIII noble metal deposited upon an alumina surface.

Furthermore, oxidation catalysts, as used as auto exhaust oxidation catalysts, may be readily prepared using the presently contemplated technique. To prepare the auto exhaust catalyst, the inorganic substrate, which frequently comprises alumina, either in pellet or monolithic form, is immersed in a dilute solution of the desired promoter metals, which may comprise noble metals such as platinum, palladium, or other active oxidation metals, such as chromium.

The electrolytic cell container 1 is preferably fabricated from an electroconductive material, which is resistant to corrosion such as stainless steel. Furthermore, the center electrode may comprise stainless steel or carbon. While the apparatus shown in FIG. 1 is used for the batchwise preparation of catalyst composites, it should also be understood that such a cell may be operated on a continuous basis, wherein electrolyte solution and particles to be coated therein, are continuously added and removed from the cell.

Having described the basic aspects of the present invention, the following examples are given to illustrate specific embodiments thereof.

EXAMPLE I

An electrolytic cell similar to that shown in FIG. 1 was fabricated using stainless steel as the outercase, which possessed a dimension on the order of 12 inches in length and 6 x 6 inches in cross-section. A center electrode also of stainless steel was placed in the container. The container was then filled with a particulate electrode material, which comprises alumina pellets having a diameter of approximately 2 mm. and a length of approximately 5 mm. coated with carbon. The carbon coating was applied to the alumina particles by treating said particles with butane gases at 500° C. causing decomposition of the hydrocarbon on the surface and subsequent dehydrogenation to form a surface layer of semi-conducting carbon.

An electrolyte solution, which comprised 1% by weight chloroplatinic acid in aqueous solution was then added to the cell. A voltage of 1.5 volts was maintained across the anode and cathode for a period of approximately 30 minutes at room temperature. Subsequent to this period, the catalyst particles were removed from the cell and subjected to heating and air at a temperature of approximately 800° F. Subsequent to this air treatment, the particles were analyzed and found to contain approximately 0.2% by weight platinum impregnated upon the alumina surface.

The above description and specific examples clearly indicates that a novel, useful, catalyst preparation technique has been developed.

I claim:

1. A method for preparing metal containing catalysts which comprises:
    (a) coating an inorganic oxide support with a semiconductive layer of carbon;
    (b) contacting a carbon coated inorganic oxide support with a solution of metal ion under electrolytic conditions to deposit a layer of metal thereon; and
    (c) oxidizing and removing said carbon to obtain a metal containing inorganic oxide catalyst composition.

2. The method of Claim 1 wherein said inorganic oxide support is coated with carbon by thermal decomposition of a hydrocarbon.

3. The method of Claim 1 wherein the support is selected from the group consisting of silica, alumina, silica-alumina hydrogel, clay, and crystalline aluminosilicate molecular sieve zeolite.

4. The method of Claim 1 wherein said metal is selected from the Group consisting of Group VI and Group VIII metals of the periodic table.

5. The method of Claim 1 wherein said support possesses a particle size of at least 1 mm. in cross-sectional diameter and the length thereof is greater than the cross-sectional diameter.

References Cited

UNITED STATES PATENTS

| | | | |
|---|---|---|---|
| 2,777,881 | 1/1957 | Neuworth | 252—447 X |
| 2,984,604 | 5/1961 | Duva et al. | 204—47 |
| 2,112,931 | 4/1938 | Schulze | 252—447 X |
| 1,907,710 | 5/1933 | Bass | 204—47 X |
| 2,028,312 | 1/1936 | Bornhauser | 204—47 X |
| 2,793,170 | 5/1957 | Stiles et al. | 252—447 X |
| 3,360,134 | 2/1967 | Pullen | 252—447 X |

CARL F. DEES, Primary Examiner

U.S. Cl. X.R.

252—455 R, 455 Z, 459, 465, 466 R